(12) United States Patent
del Valle Diharce et al.

(10) Patent No.: US 11,100,196 B2
(45) Date of Patent: Aug. 24, 2021

(54) SYSTEMS AND METHODS FOR CONTENT RIGHTS PORTABILITY

(71) Applicant: Rovi Guides, Inc., San Jose, CA (US)

(72) Inventors: Jose Eduardo del Valle Diharce, Dallas, TX (US); Benjamin Harden, Coronado, CA (US)

(73) Assignee: Rovi Guides, Inc., San Jose, CA (US)

( * ) Notice: Subject to any disclaimer, the term of this patent is extended or adjusted under 35 U.S.C. 154(b) by 258 days.

(21) Appl. No.: 16/440,598

(22) Filed: Jun. 13, 2019

(65) Prior Publication Data
US 2020/0394280 A1 Dec. 17, 2020

(51) Int. Cl.
*G06F 21/10* (2013.01)
*H04L 9/14* (2006.01)
*G06F 21/62* (2013.01)

(52) U.S. Cl.
CPC .......... *G06F 21/10* (2013.01); *G06F 21/6209* (2013.01); *H04L 9/14* (2013.01); *G06F 2221/0708* (2013.01); *G06F 2221/2111* (2013.01); *G06F 2221/2137* (2013.01); *G06F 2221/2141* (2013.01)

(58) Field of Classification Search
CPC .............. G06F 21/10; G06F 21/6209; G06F 2221/0708; G06F 2221/2111; G06F 2221/2137; G06F 2221/2141; H04L 9/14
See application file for complete search history.

(56) References Cited

U.S. PATENT DOCUMENTS

| 7,761,892 | B2 | 7/2010 | Ellis | |
|---|---|---|---|---|
| 2011/0219229 | A1* | 9/2011 | Cholas | H04L 9/32 713/168 |
| 2011/0258706 | A1* | 10/2011 | Rouse | G06F 21/10 726/28 |
| 2012/0216289 | A1* | 8/2012 | Kawaguchi | G06F 21/10 726/26 |

* cited by examiner

*Primary Examiner* — Hee K Song
(74) *Attorney, Agent, or Firm* — Haley Guiliano LLP

(57) ABSTRACT

The system and methods described allow a content delivery application to provide temporary access to a content item for display on a content access device based on a user obtaining access to the content item initially on another system. The content delivery application receives content accessed confirmation that user access a content item and then monitors whether that access was interrupted. If the access was interrupted, the content delivery application generates a content access bookmark based on a content timeline and stores a content access authorization comprising the content access bookmark and an identifier from the profile. When the user requests the content item, the content delivery application transmits access information corresponding to segments of the content item, based on the content access bookmark to a user's device.

20 Claims, 8 Drawing Sheets

SYSTEMS AND METHODS FOR CONTENT RIGHTS PORTABILITY

BACKGROUND

The present disclosure is directed to content delivery systems and, more particularly, a content rights portability between content delivery systems.

SUMMARY

Currently, there are many scenarios where a user is granted rights to access and consume content, but the user is unable to consume the content through to its end. In some cases, a user acquires the right to view content but for some reason is unable to finish it. For example, a user may visit a movie theater and pay to watch a particular movie. The user may, for any number of reasons, need to leave the movie theater before the end of the movie. Because the user is leaving the theater, the user would lose the ability to watch the end of the movie. In another example, a user may purchase a movie to view during an airplane flight, but the flight ends before the movie completes.

The systems and methods described herein address these issues by providing techniques to make the content rights for accessing content portable; that is, to allow the content rights to transfer from one content delivery system to another. A content delivery system is described that receives a content access confirmation that informs the system that the user has been granted content rights. As described more fully below, the content delivery system may receive a message from another system (e.g., a transaction system), may receive a message from a mobile device that has scanned a code that was provided to the user, or may receive some other appropriate messaging. In some embodiments, the content access confirmation identifies a content access location and identifies the content item for which rights were granted. The content delivery system may then monitor various situations to determine whether content rights should be made portable. For example, the content delivery system may monitor whether a device associated with the user left the content access location or whether content delivery was halted because the plane the user was on landed. In response to determining content rights should be made portable, the content delivery system generates a content access bookmark based on the current playback point for the content and stores a content access authorization for the user's profile that comprises the content access bookmark and a profile identifier.

The content delivery system may then receive a content access request from a device in use by the user, e.g., a mobile device. The content delivery system will determine the requested content item and user profile from the content access request. The content delivery system determines whether the content access request can be granted. For example, the content delivery system determines whether a content access authorization exists for the content item and user profile identified in the content access request. If the content access request is authorized, the content delivery system transmits, to a content access device, access information corresponding to missed segments of the content item, so that the content access device may generate the missed portions of the content item.

It should be noted that the methods and systems described herein for one embodiment may be combined with other embodiments as discussed herein. It should be emphasized that the term "comprises/comprising" when used in this specification specifies the presence of stated features, steps or components, but does not preclude other features, steps, components or groups thereof.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF THE DRAWINGS

Figure 1:
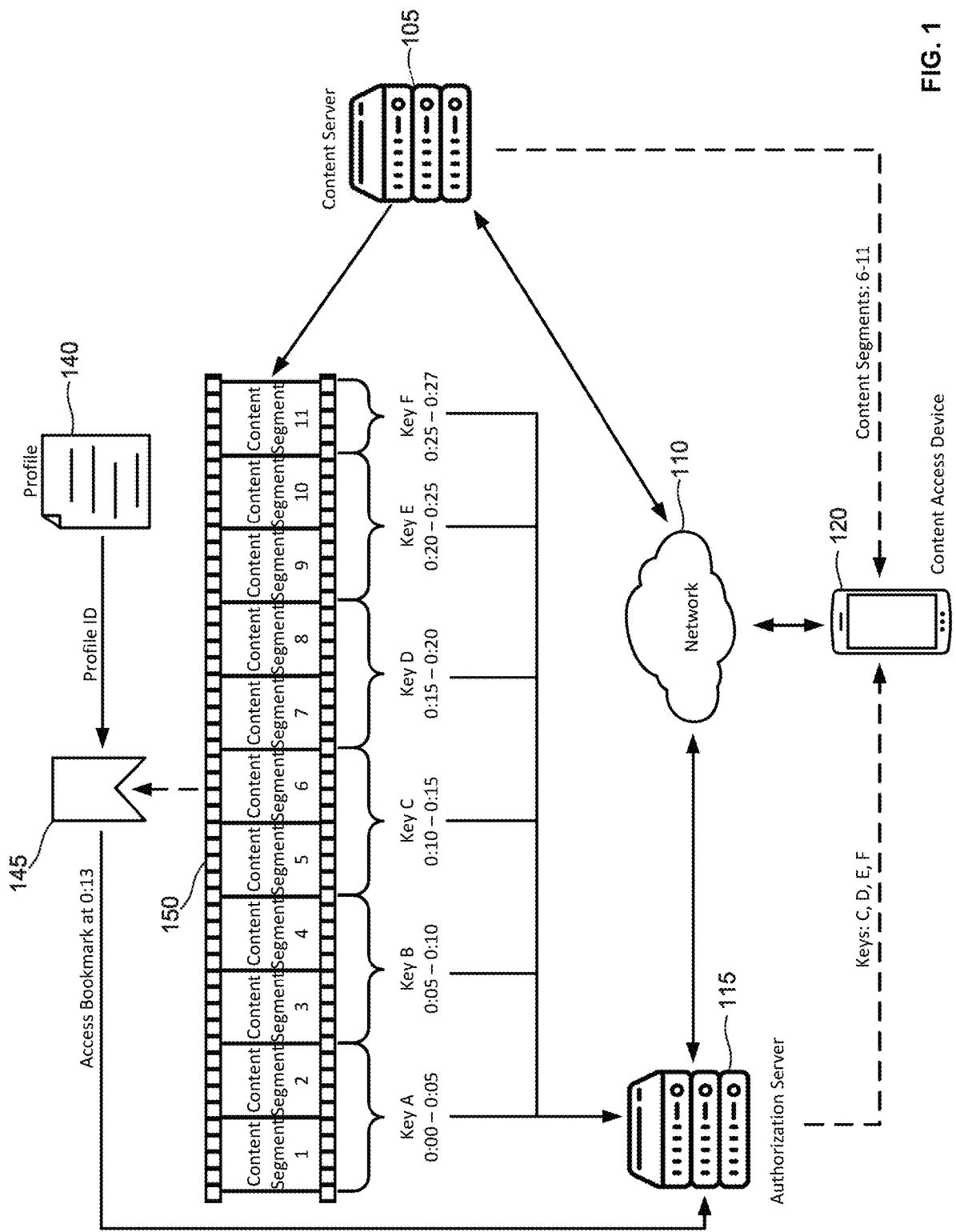
FIG. 1 shows an illustrative example of a content delivery system providing access information for a missed portion of a content item to a content access device, in accordance with some embodiments of the disclosure.

FIG. 1 shows an illustrative example of a content delivery system providing access information for a missed portion of a content item to a content access device, in accordance with some embodiments of the disclosure. FIG. 1 depicts communication, across a network 110, between devices communicating in, and with, a content delivery system. The content delivery system includes, for example, a content server 105 and authorization server 115. In FIG. 1 a content access device 120 (e.g., a mobile phone or a tablet) is in communication with the devices of the content delivery system.

As described above, a goal of the content delivery system is to enable content rights portability for content items such that content rights may be granted to a user under initial conditions and then those content rights may be modified, extended, or transferred to allow a user to access the content item under other conditions.

As depicted in FIG. 1, a content item 150 (e.g., a movie, audio track, podcast, concert recording, television show, live performance recording, etc.) is made up of a plurality of content segments. In this example, content item 150 is comprised of 11 segments of content spanning from the beginning of content item 150 (0:00 time mark) through 27 minutes of content (0:27 time mark). In the example of FIG. 1, content item 150 is stored at content server 105. As shown in FIG. 1, access information for content item 150 is stored at the authorization server 115. For example, each content segment 1-11 may be encrypted and associated with a decryption key. In some embodiments, one key (e.g., Key A) may be used to decrypt multiple content segments (e.g., contents segments 1-2). In some embodiments, and as described below, the content delivery system may encrypt and store content segments specifically encrypted for a user profile. In such scenarios, the content delivery system may encrypt only the segments for which a user was unable to view (e.g., all segments of a content item that contain unwatched portions). In some embodiments, content item 150 may be stored remotely, e.g., at a third-party streaming server or on a content delivery network, and in that example the content server 105 may store metadata regarding content item 150 (e.g., access url, content segment identifications, content title, content access location).

In the example of FIG. 1, the content delivery system created an access bookmark 145 at time mark 0:13 for a user having profile 140. This access bookmark 145 can be used to give access to unwatched content starting at time mark 0:13 which starts in content segment 6 and goes through content segment 11. Thus, content segments 6-11 would need to be accessed to watch the unwatched portions of content item 150 indicated by the access bookmark 145. The content delivery system generates the access bookmark 145 to capture a profile identifier from profile 140 and the time mark at which the content delivery system determined that a user was interrupted while consuming content item 150.

The content access device 120 may then transmit a request to resume playback of the content item 150 on behalf of the user. The content access device may, for example, transmit a request to the content delivery system with an identifier for the content item and a profile identifier for the user. The authorization server 115 can determine whether the content access request is authorized using the identity of the content item and the profile identifier. Using the example of FIG. 1, the content delivery system determines that a content request for content item 150 is authorized to resume playback of content item 150 and transmits the requested access information to the content access device 120. In some embodiments, content segments are stored in an encrypted format and metadata is stored to identify a decryption key for the segments. In some embodiments, multiple content segments, e.g., two sequential content segments, share a key. As illustrated in FIG. 1, content segments 1 and 2 are encrypted with a shared key that can be decrypted with Key A. Likewise, content segments 3 and 4 can be decrypted with shared Key B, content segments 5 and 6 can be decrypted with shared Key C, content segments 7 and 8 can be decrypted with shared Key D, content segments 9 and 10 can be decrypted with shared Key E, and content segment 11 can be decrypted with Key F. Notably, by pre-encrypting different content segments with different keys, the content delivery system may share only the decryption keys necessary to allow a user to decrypt the portions of the content they've been granted access to. Continuing the example of FIG. 1, the content delivery system has granted access to resume playback of content item 150 beginning at time mark 0:13 which starts in content segment 6. Therefore, playback of the content item 150 requires content segments 6-11 and decryption Keys C-F. The content delivery system can provide content access device 120 with Key C, D, E, and F but hold back Keys A and B. Therefore, the content access device 120 would be unable to decrypt content segments 1-4 and would prevent unauthorized access to those segments. In another embodiment, the content delivery system may store copies of content segments 6-11 that are specifically encrypted for profile 140 and provides a decryption key to content access device 120 to decrypt those specific segments.

Along with sending Keys C-F to the content access device 120, the content delivery system may provide the content segments for the playback portions of content item 150. For example, the content access device 120 may utilize URLs identified in access information for the corresponding segments and transmits requests (e.g., HTTP DASH requests) to the content server 105. The content server 105 may then respond by providing the encrypted portions of the content 150 (e.g., encrypted copies of content segments 6-11).

As an example, a user may purchase a movie theater ticket from an online ticket provider. The online ticket provider transmits content access confirmation to the content delivery system, which identifies the user, using, for example, a profile or a profile identifier. In some embodiments, the content access confirmation may use a mobile device identifier, e.g., an international mobile equipment identity number, as a profile identifier or may provide a mobile device identifier (e.g., IMEI number or mobile telephone number) along with a profile identifier. The content delivery system then monitors whether the user was interrupted while watching the movie. For example, the content delivery system may monitor a Bluetooth® signal from the user's mobile device to determine the user left the vicinity of the movie theater, may monitor a theater's WiFi environment to determine whether a user's device is connected, or may monitor a GPS location provided to the content delivery system from the mobile device and determine that the GPS location left the movie theater and did not return or left a geographic boundary (e.g., geofence) around a movie theater. The content delivery system may then generate an access bookmark designating a time mark in a content item for when the user was interrupted and associate the access bookmark with the user's profile (e.g., by storing the profile identifier in the access bookmark). The content delivery system provides the access bookmark to an authorization server (e.g., authorization server 115) in the content delivery system. The content delivery system also notifies the user (e.g., by way of email, text message, or application pop-up) that the user has been granted content rights to continue playback of the content. In some embodiments, the content delivery system provides the user an opportunity to purchase portable content rights via a payment method system (e.g., payment through in-app purchasing, text message purchasing, credit card entry). For example, the content delivery system may notify the user that for an additional fee, the user may continue watching the content item on their own content access device (e.g., a mobile phone, tablet, AppleTV, AndroidTV, Roku streaming box, smart television, DVD player, Blueray player, etc.). A user may then use a content access device (e.g., a mobile phone or tablet) to resume playback of the content item at the time mark indicated by the access bookmark. The content delivery system provides access information (e.g., URLs to content segments, decryption keys, content segment identifiers) which the content access device uses to communicate with a content server to receive the content segments corresponding to the missed portions of the content item. In the case where each segment is encrypted with a separate encryption key, the content access device may utilize the decryptions keys provided that correspond with each segment. The content access device may obtain encrypted content segments from the content delivery system and use the access information to generate playback of the content segments.

Figure 2:
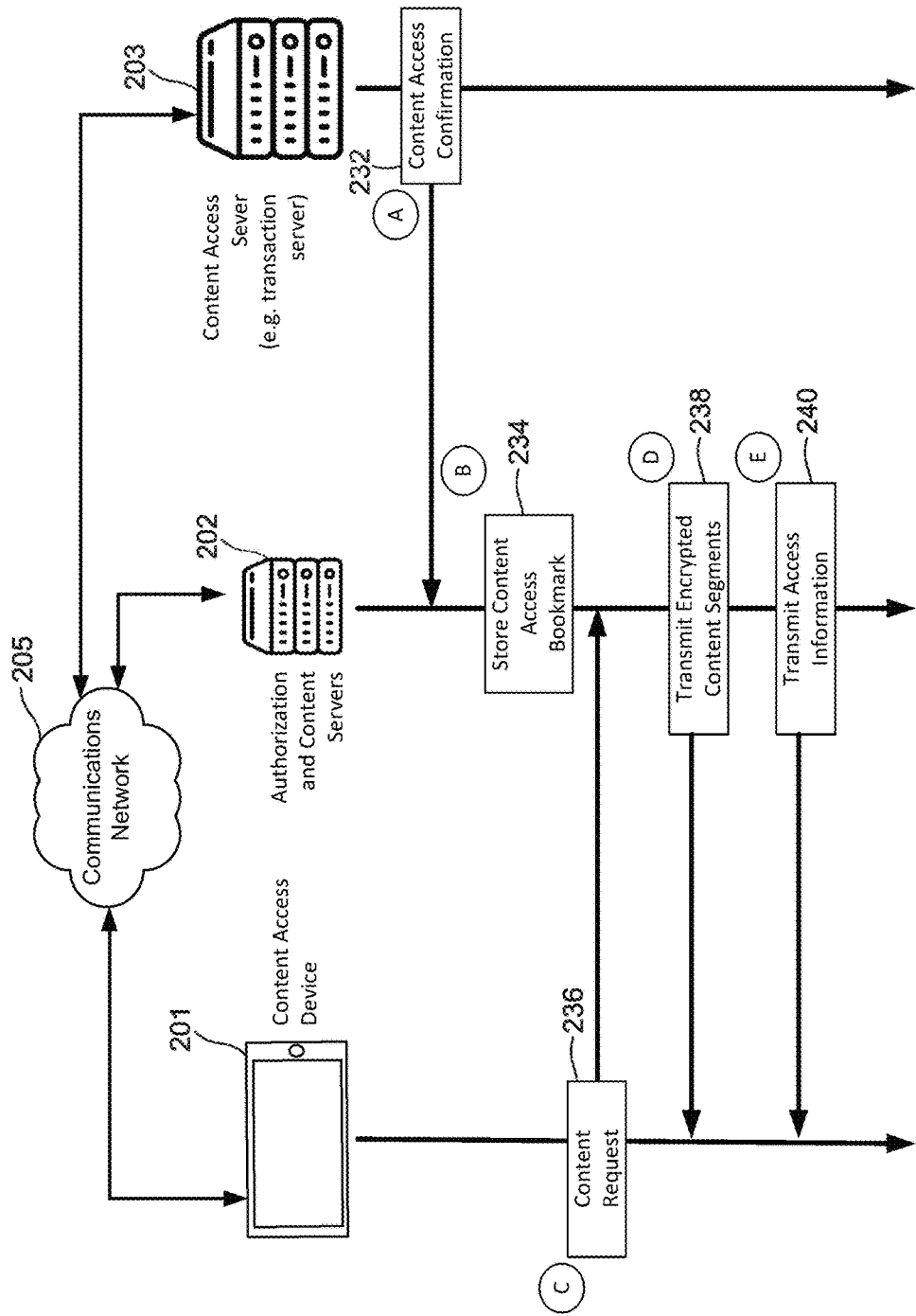
FIG. 2 shows an illustrative example of a message and process flow between a content access device, authorization and content servers, and a content access server, in accordance with some embodiments of the disclosure.

FIG. 2 shows an illustrative example of a message and process flow between a content access device, authorization and content servers, and a content access server, in accordance with some embodiments of the disclosure. FIG. 2 depicts communications between content access device 201, a content delivery system (e.g., authorization and content servers 202), and a content access server 203. As described below with reference to FIGS. 3 and 4, the devices 201, 202, and 203 may include components, circuitry, and instructions designed to implement the methods and systems described herein. For example, content access device 201 may be implemented using hardware described with reference to content access device 300 or with reference to content access device 301. In another example, authorization and content servers 202 and content access server 203 may be implemented using hardware described with reference to server 404.

A content access device 201 utilizing at least some of the system features described above in connection with FIG. 3 may, like some computer equipment, be Internet-enabled allowing access to Internet content, while other content access devices may, like some television equipment, include a tuner, allowing access to television programming. An application providing the techniques described herein may have the same layout on various different types of content access devices or may be tailored to the display capabilities of the content access device. For example, on content access devices accessing Internet content, a content access application may be provided as a website accessed by a web browser. In another example, the content access application may be scaled down for wireless user communications devices.

A content delivery system typically communicates with more than one content access device 201 and content access server 203 but only one of each is shown in FIG. 2 to avoid overcomplicating the drawing. In addition, each user may utilize more than one type of content access device and also more than one of each type of content access device. Furthermore, a content delivery system typically comprises multiple authorization and content servers 202.

Devices 201, 202, and 203 of FIG. 2 may be in communication through a communications network 205. Communications network 205 may be one or more networks including the Internet, a mobile phone network, mobile voice or data network (e.g., a 4G or LTE network), cable network, public switched telephone network, or other types of communications network or combinations of communications networks. Communication paths may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the content access devices may be provided by one or more of these communications paths but are shown as a single path in FIG. 2 to avoid overcomplicating the drawing.

Content access devices may communicate directly with each other via communication paths, such as those described above, as well as other short-range point-to-point communication paths, such as USB cables, IEEE 1394 cables, wireless paths (e.g., Bluetooth, infrared, IEEE 802.11x, etc.), or other short-range communication via wired or wireless paths. BLUETOOTH is a certification mark owned by Bluetooth SIG, INC. The content access devices may also communicate with each other through an indirect path via communications network 205.

The content delivery system comprises content sources such as authorization and content servers 202. The content delivery system also includes metadata sources, which may include content server 202 or may comprise additional servers not depicted in FIG. 2, for providing metadata. Communications with the content sources and media guidance data sources may be exchanged over one or more communications paths via, for example, communications network 205. In addition, there may be more than one of each of content source and media guidance data source. If desired, a content source and a metadata data source may be integrated as one source. Furthermore, an authorization server may be integrated with a content server into one server. Although communications between sources and content access devices are shown as being through communications network 205, in some embodiments, sources may communicate directly with content access devices via communication paths (not shown) such as the short-range point-to-point communication paths described above.

A content source, e.g., content server 202, may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. The content source may be the originator of content (e.g., a television broadcaster, a Webcast provider, etc.) or may not be the originator of content (e.g., an on-demand content provider, an Internet provider of content of broadcast programs for downloading, etc.). A content source may include cable sources, satellite providers, on-demand providers, Internet providers, over-the-top content providers, or other providers of content. A content source may also include a remote media server used to store different types of content (including video content selected by a user), in a location remote from any of the content access devices. Systems and methods for remote storage of content and providing remotely stored content to content access devices are discussed in greater detail in connection with Ellis et al., U.S. Pat. No. 7,761,892, issued Jul. 20, 3010, which is hereby incorporated by reference herein in its entirety.

A metadata data source (e.g., content server 202) may provide metadata, such as the metadata described above. Metadata may be provided to the content access devices using any suitable approach. In some embodiments, a content access application may include a stand-alone interactive application (e.g., a content application) that receives content data via a data feed (e.g., a continuous feed or trickle feed).

In some embodiments, metadata from metadata sources may be provided to content access devices using a client-server approach. For example, a content access device may pull metadata from a server, or a server may push metadata to a content access device. In some embodiments, a content access application client residing on the content access device may initiate sessions with sources to obtain metadata when needed, e.g., when the metadata is out of date or when the content access device receives a request from the user to receive data. Metadata may be provided to the content access device with any suitable frequency (e.g., continuously, daily, a user-specified period of time, a system-specified period of time, in response to a request from content access device, etc.). A metadata source may provide to content access devices (e.g., content access device 201) the application itself or software updates for the application.

In some embodiments, content server 202 are delivering content to multiple destination devices. For example, a content server for a piece of content, e.g., a recent movie, may utilize OTA broadcast techniques using OTA broadcast hardware (e.g., terrestrial television transmission antennas and attendant hardware). Another content source for the same content may utilize cellular broadcast hardware (e.g., Long-Term Evolution (LTE) transmission antennas and attendant hardware) to deliver the content. In some embodiments, one or more of the content sources may delivery content by network-based communication to destination devices (e.g., using Internet-based unicast or multicasting).

At point A of FIG. 2, content access server 203 transmits a content access confirmation 232 to the authorization and content servers 202. A content access confirmation message contains sufficient information to identify that a user obtained access to a content item. For example, a content access server 203 may be a transaction server that tracks purchases by users for access to content (e.g., users' purchases of movie tickets or rental of movies in flight on a plane). In another example, content access server 203 receive messages from a mobile device in use by a user after a user has scanned a content access code (e.g., a bar code, QR code, unique string, or other appropriate code, string or image) that indicates the user was given access to a content item. The content access confirmation typically contains an identifier for the content item and an identifier for the user, such as a profile identifier. The content access confirmation may further comprise a content access location (e.g., flight number or movie theater geographic location). Upon receiving the content access confirmation, the content delivery system (comprised of authorization and content servers 202) may begin monitoring whether the user's consumption of the content was interrupted. For example, the content delivery system may access flight records to determine an estimated time of arrival and/or monitor actual plane location. When the plane reaches its destination, the content delivery system may determine whether playback of the content item was completed for the user. If playback did not complete, the content delivery system records the current time mark of playback for the content item and stores a content access bookmark 234 at point B. In some embodiments, the content delivery system may monitor a GPS location of a mobile device associated with the user. For example, the user may activate an application on his mobile device that transmits GPS coordinates to the content delivery system 200. If the user leaves a content access location (e.g., a movie theater) then the content delivery system can determine that the user was unable to complete watching the content item and record a content access bookmark 234. In some embodiments, the content delivery system may wait for a time threshold to pass, e.g., five minutes, before considering the user's content consumption as interrupted. In that case, the content delivery system would note the time when it determines the user's consumption was interrupted even though it waits an additional amount of time before considering the experience as interrupted. The content delivery system may store the content access bookmark either when it first determines the user's consumption was interrupted (e.g., when it first determines the user's mobile device left the content access location) or may store the content access bookmark after the threshold of time is completed. In some embodiments, the content delivery system may utilize radio communication with the user's mobile device to determine whether the user's mobile device is present at the content access location. For example, the content delivery system may engage in Bluetooth communication with the mobile device and uniquely identify the device. The content delivery system may then associate uniquely identified devices with user profiles. For example, users may be asked to confirm their identity by any appropriate technique such as logging in to an application view username and password, providing a confirmation email, providing a telephone number, or sending a text message to a specific recipient. In another example, the content delivery system may identify mobile devices via Wi-Fi connections and uniquely identify mobile devices by MAC address or IP address. When the user's mobile device transitions from a Wi-Fi access point, the content delivery system may use that as a trigger to determine whether the user is still consuming the content item. In some embodiments, the content delivery system may require a confirmation that a user's consumption of a content item was interrupted to prevent a user from simply turning off the Wi-Fi capabilities of a mobile device during the presentation of a content item. For example, the content delivery system may require that the user scan an exit code provided to the user outside of a content access location.

At point C, the content access device 201, which may be the same as the user's mobile device or a separate device, transmits a content request 236 to the content delivery system, e.g., to authorization and content servers 202. The content request 236 comprises information identifying the profile of a user associated with or using the content access device 201 (e.g., a user that logged in to the content access device 201) along with information identifying the content item that the content access device 201 is requesting. The content delivery system determines whether the content request is approved. For example, an authorization server may perform a database query using a content ID and a profile ID to determine whether a content access bookmark was previously stored for the user. Moreover, the content delivery system may determine whether the content access bookmark remains valid. For example, the content delivery system may enforce a policy whereby content rights are granted for a limited time after the content access occurs at point A; e.g., content requests must occur within 7 days of the initial content access authorization. If the content request is approved, the content delivery system delivers access information for portions of the content item that were missed and the portions of the content item. For example, authorization and content servers 202 send encrypted content segments 238 corresponding to the missed portions of the content item at point D and transmit the requisite decryption keys for those portions of the content item (e.g., access information 240) at point E. The content access device 201 can then use the encrypted portions of the content item and the access information to generate the missed portions of the content item for display.

The instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

Applications may be, for example, stand-alone applications implemented on content access devices or content sources. For example, a content delivery application or content access application may be implemented as software or a set of executable instructions, which may be stored in storage 308 and executed by control circuitry 304 of content access device 300 and content access device 301. In some embodiments, applications may be client-server applications where only a client application resides on the content access device, and a server application resides on a remote server. For example, applications may be implemented partially as a client application on control circuitry 304 of each one of content access device 300 and content access device system 301 and partially on a remote server as a server application (e.g., content server 202) running on control circuitry of the remote server. When executed by control circuitry of the remote server (such as content server 202), the content delivery application may instruct the control circuitry to generate the content delivery application displays and transmit the generated displays to the content access devices. The server application may instruct the control circuitry of the content source to transmit data for storage on the content access devices. The client application may instruct control circuitry of the receiving content access device to generate the content delivery application displays.

Figure 3:
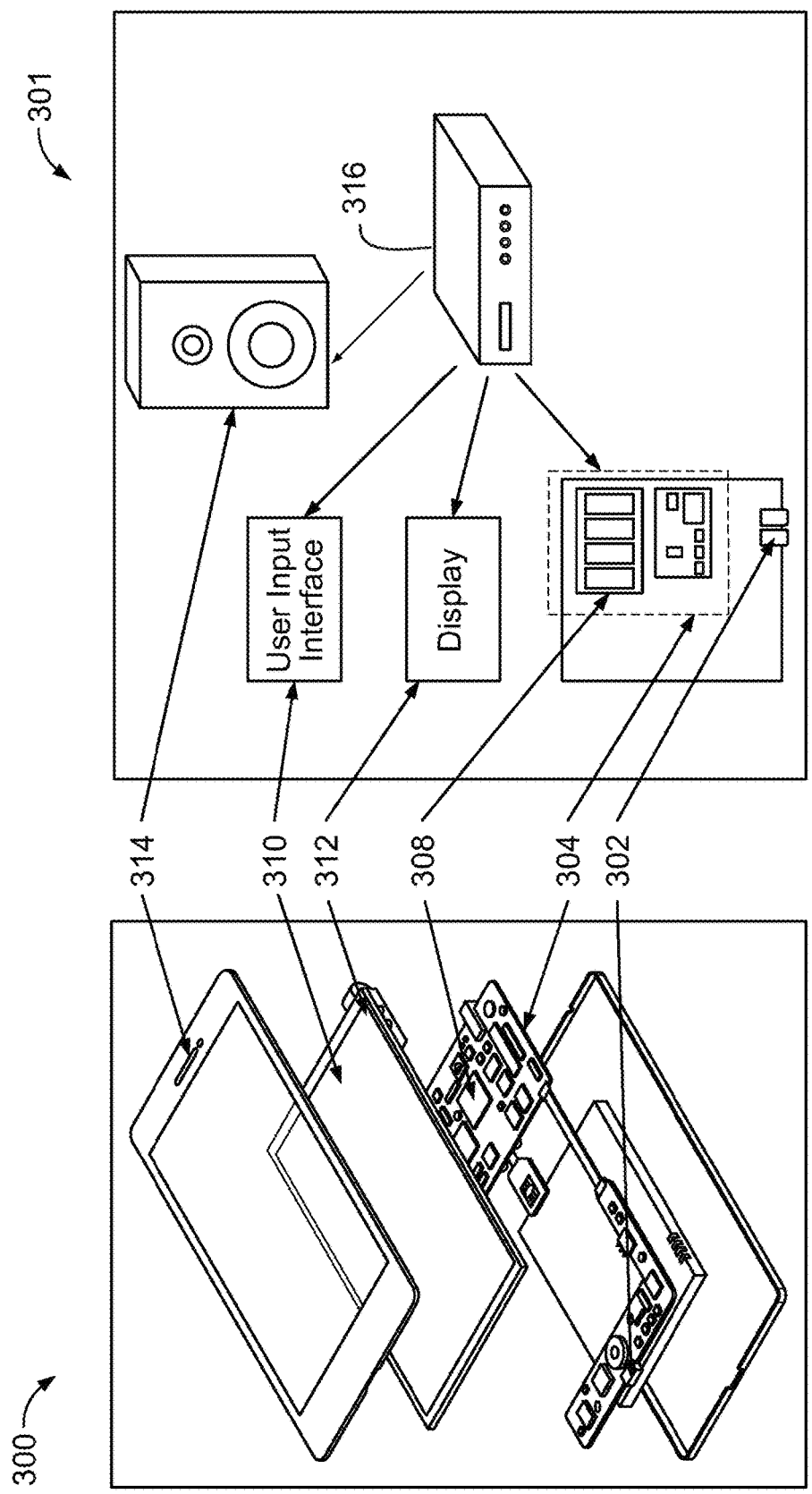
FIG. 3 is a block diagram of illustrative content access devices, in accordance with some embodiments of the disclosure.

Users may access content and the applications from one or more of their content access devices. FIG. 3 shows generalized embodiments of an illustrative device, i.e., content access device 201. For example, content access device 201 may be a smartphone device, a tablet, or a remote control, such as illustrative content access device 300. In another example, content access device 201 may be a content access device system 301. Content access device system 301 may include a set-top box 316. Set-top box 316 may be communicatively connected to speaker 314 and display 312. In some embodiments, display 312 may be a television display or a computer display. In some embodiments, set-top box 316 may be communicatively connected to user interface input 310. In some embodiments, user interface input 310 may be a remote-control device. Set-top box 316 may include one or more circuit boards. In some embodiments, the circuit boards may include control circuitry and storage (e.g., RAM, ROM, Hard Disk, Removable Disk, etc.). In some embodiments, circuit boards may include an input/output path. More specific implementations of content access devices are discussed below in connection with FIG. 4. Each one of content access device 300 and content access device system 301 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304 and storage 308. Control circuitry 304 may be used to send and receive commands, requests, and other suitable data using I/O path 302. I/O path 302 may connect control circuitry 304 to one or more communications paths (described below). I/O functions may be provided by one or more of these communications paths but are shown as a single path in FIG. 3 to avoid overcomplicating the drawing.

Control circuitry 304 should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for an application stored in memory (e.g., storage 308). Specifically, control circuitry 304 may be instructed by the application to perform the functions discussed above and below. For example, the application may provide instructions to control circuitry 304 to generate the media guidance displays. In some implementations, any action performed by control circuitry 304 may be based on instructions received from the application.

In client server-based embodiments, control circuitry 304 may include communications circuitry suitable for communicating with a content delivery application server or other networks or servers. The instructions for carrying out the above-mentioned functionality may be stored on the content delivery application server. Communications circuitry may include a cable modem, an integrated services digital network (ISDN) modem, a digital subscriber line (DSL) modem, a telephone modem, an Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of content access devices, or communication of content access devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, non-transitory computer-readable medium, or any other suitable fixed or removable storage devices, and/or any combination of the same. Storage 308 may be used to store various types of content, media guidance data, and instructions for executing content access applications. Nonvolatile memory may also be used (e.g., to launch a boot-up routine and other instructions).

Control circuitry 304 may include video-generating circuitry and tuning circuitry, such as one or more analog tuners, one or more video decoders (e.g., H.264 decoder, H.265 decoder, MPEG-2 decoders or other digital decoding circuitry), high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the content access device 300. Circuitry 304 may also include digital-to-analog converter circuitry and analog-to-digital converter circuitry for converting between digital and analog signals. The tuning and encoding circuitry may be used by the content access device to receive and to display, play, or record content. The tuning and encoding circuitry may also be used to receive guidance data. The circuitry described herein, including, for example, the tuning, video-generating, encoding, decoding, encrypting, decrypting, scaler, and analog/digital circuitry, may be implemented using software running on one or more general-purpose or specialized processors. Multiple tuners may be provided to handle simultaneous tuning functions (e.g., watch-and-record functions, picture-in-picture (PIP) functions, multiple-tuner recording, etc.). If storage 308 is provided as a separate device from content access device 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touchscreen, touchpad, stylus input, joystick, voice recognition interface, or other user input interfaces. Display 312 may be provided as a stand-alone device or integrated with other elements of each one of content access device 300 and content access device system 301. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be integrated with the control circuitry 304. Speakers 314 may be provided as integrated with other elements of each one of content access device 300 and content access device system 301 or may be stand-alone units. The audio component of videos and other content displayed on display 312 may be played through speakers 314. In some embodiments, the audio may be distributed to a receiver (not shown), which processes and outputs the audio via speakers 314.

The content delivery application and/or content access application may be implemented using any suitable architecture. For example, those applications may be stand-alone applications wholly implemented on each one of content access device 300 and content access device system 301. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions for the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the applications are client server-based application. Data for use by a thick or thin client implemented on each one of content access device 300 and content access device system 301 is retrieved on-demand by issuing requests to a server remote to each one of content access device 300 and content access device system 301. In one example of a client server-based content delivery application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the applications are downloaded and interpreted or otherwise run by an interpreter or virtual machine (run by control circuitry 304). In some embodiments, the applications may be encoded in the ETV Binary Interchange Format (EBIF), received by control circuitry 304 as part of a suitable feed, and interpreted by a user agent running on control circuitry 304. For example, the applications may be an EBIF application. In some embodiments, the content delivery application may be defined by a series of files (e.g., Python, Javascript, HTML, or JAVA-based files) that are received and run by a local machine or virtual machine or other suitable middleware executed by control circuitry 304. In some of such embodiments (e.g., those employing MPEG-2 or other digital media encoding schemes), the applications may be, for example, encoded and transmitted in an MPEG-2 object carousel with the MPEG audio and video packets of a program.

Content sources (e.g., content server 202 and content sources 203) and media guidance sources comprise elements similar to those found in content access device 300 and content access device system 301. For example, content sources and media guidance sources include control circuitry, storage, and IO paths as described above. In some embodiments, content sources and media guidance sources further include user input interface 310, speaker 314, and/or display 312. These components operate in a manner similar to the descriptions provided with reference to content access device 300 and content access device system 301.

Figure 4:
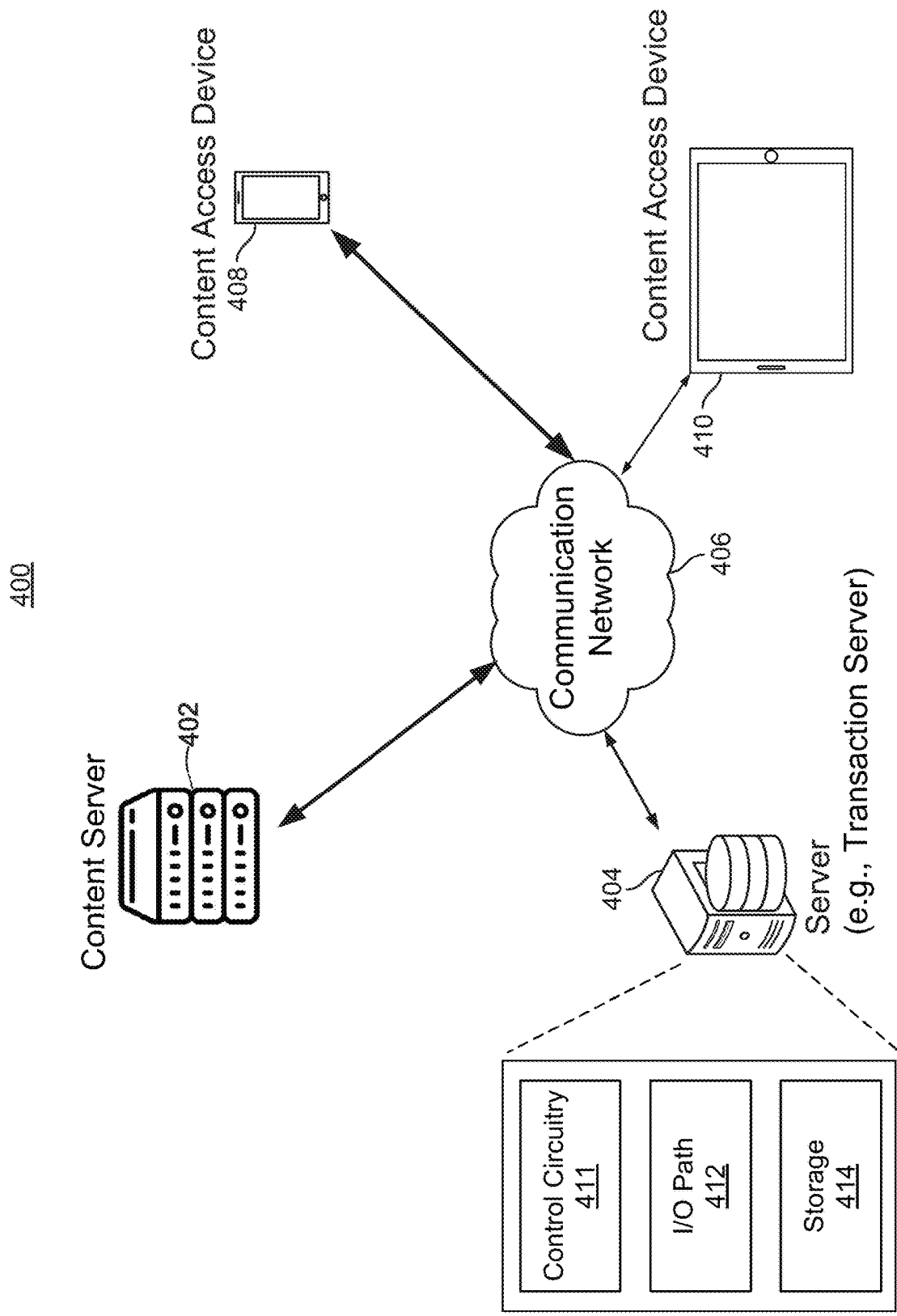
FIG. 4 is a block diagram of an illustrative network diagram showing the connections between devices, in accordance with some embodiments of the disclosure.

FIG. 4 is a block diagram of an illustrative network diagram showing the connections between devices, in accordance with some embodiments of the disclosure. Content access devices 408 and 410 may be coupled to communication network 406. Communication network 406 may be one or more networks including the Internet, a mobile phone network, mobile voice or data network (e.g., a 4G or LTE network), cable network, public switched telephone network, or other types of communications network or combinations of communications networks. Paths (e.g., depicted as arrows connecting the respective devices to communication network 406) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 4 to avoid overcomplicating the drawing.

Although communications paths are not drawn between Content access devices, these devices may communicate directly with each other via communication paths as well as other short-range, point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The Content access devices may also communicate with each other directly through an indirect path via communication network 406.

System 400 includes content server 402 and server 404 (e.g., authorization server 115, or content access server 203). Communications with the content server 402 and server 404 may be exchanged over one or more communications paths but are shown as a single path in FIG. 4 to avoid overcomplicating the drawing. In addition, there may be more than one of each of content server 402 and server 404, but only one of each is shown in FIG. 4 to avoid overcomplicating the drawing. If desired, content server 402 and server 404 may be integrated as one source device.

In some embodiments, the server 404 may include control circuitry 411 and storage 414 (e.g., RAM, ROM, Hard Disk, Removable Disk, etc.). The server 404 may also include an input/output path 412. I/O path 412 may provide device information, or other data, over a local area network (LAN) or wide area network (WAN), and/or other content and data to control circuitry 411, which includes processing circuitry, and storage 414. Control circuitry 411 may be used to send and receive commands, requests, and other suitable data using I/O path 412. I/O path 412 may connect control circuitry 304 (and specifically processing circuitry) to one or more communications paths.

Control circuitry 411 may be based on any suitable processing circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 411 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 411 executes instructions for an emulation system application stored in memory (e.g., storage 414).

Memory may be an electronic storage device provided as storage 414 that is part of Control circuitry 411. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions).

Server 404 may retrieve metadata from content server 402, process the data as will be described in detail below, and forward the data to the content access devices 408 and 410. Content server 402 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media content server 402 may be the originator of content (e.g., a television broadcaster, a Webcast provider, etc.) or may not be the originator of content (e.g., an on-demand content provider, an Internet provider of content of broadcast programs for downloading, etc.). Content server 402 may include cable sources, satellite providers, on-demand providers, Internet providers, over-the-top content providers, or other providers of content. Content server 402 may also include a remote media server used to store different types of content (including video content selected by a user), in a location remote from any of the client devices. Systems and methods for remote storage of content and providing remotely stored content to content access device are discussed in greater detail in connection with Ellis et al., U.S. Pat. No. 7,761,892, issued Jul. 20, 2010, which is hereby incorporated by reference herein in its entirety.

Client devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices (such as, e.g., server 404), which may be located centrally or at distributed locations, that provide cloud-based services to various types of users and devices connected via a network such as the Internet via communication network 406. In such embodiments, Content access devices may operate in a peer-to-peer manner without communicating with a central server.

Figure 5:
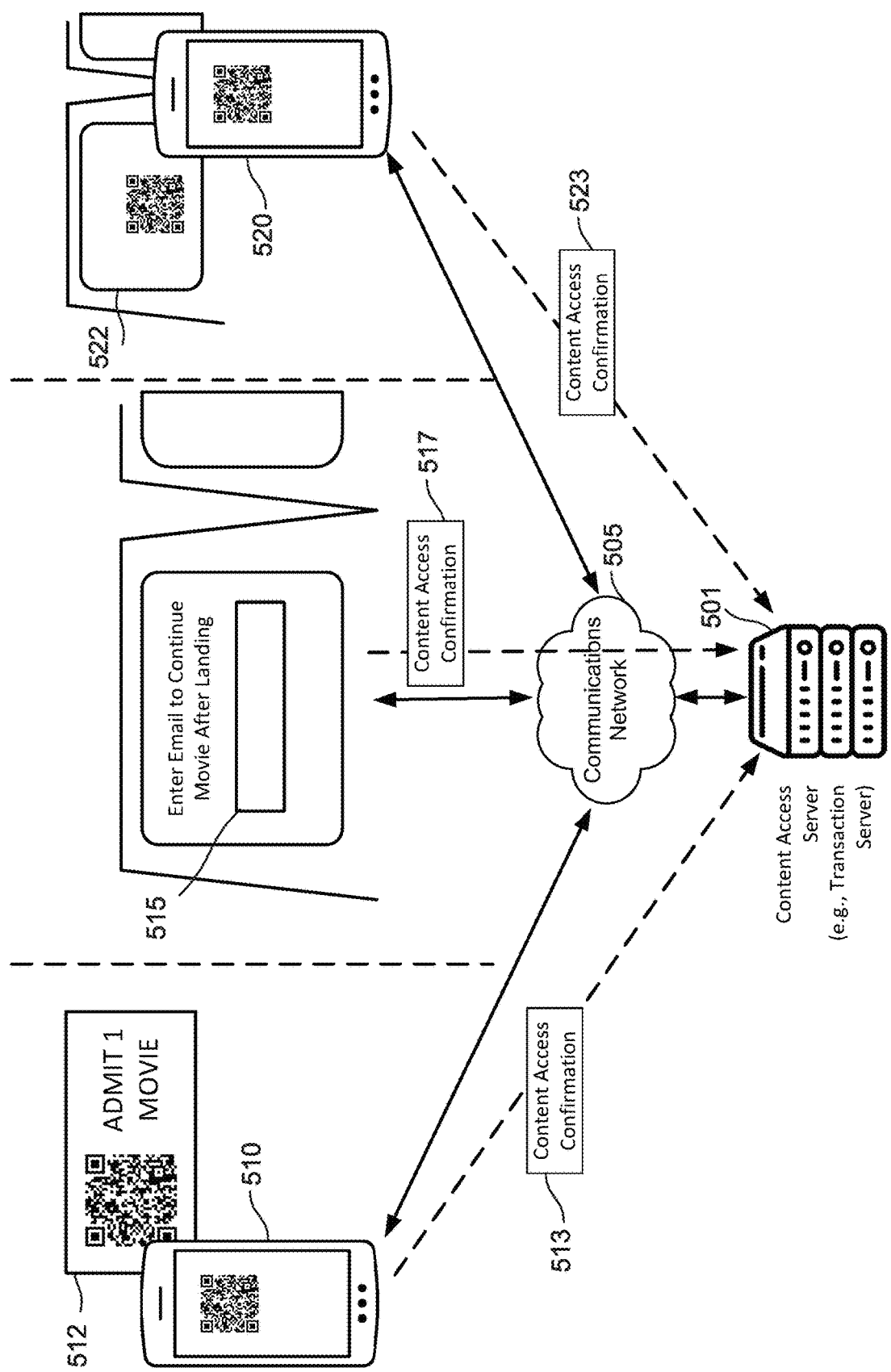
FIG. 5 shows illustrative examples of interfaces and techniques for capturing content access information, in accordance with some embodiments of the disclosure.
Figure 6:
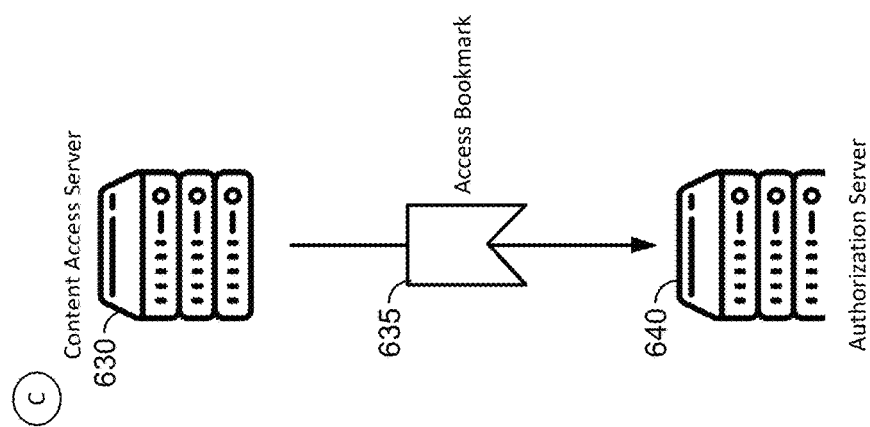
FIG. 6 shows illustrative examples of determining that content playback was interrupted before completion of the content item, in accordance with some embodiments of the disclosure.
Figure 6:
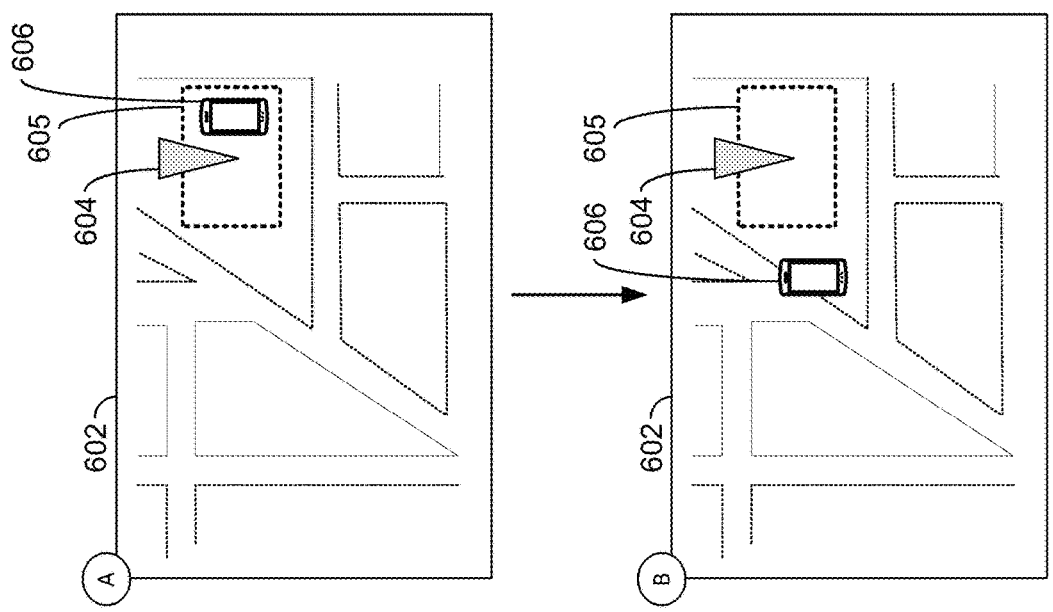
Figure 7:
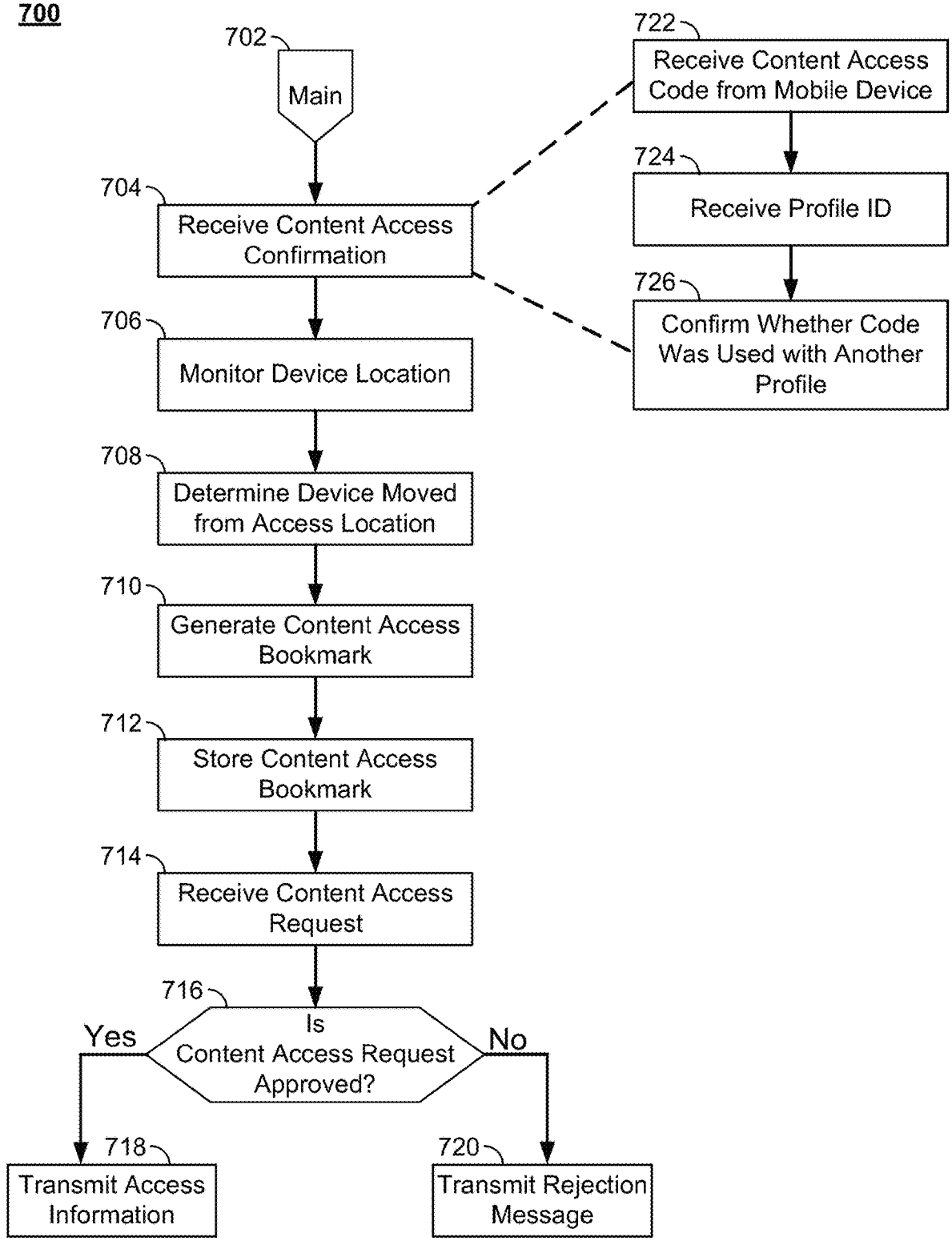
FIG. 7 is a flowchart of a detailed illustrative process for providing content rights portability using a content delivery system, in accordance with some embodiments of the disclosure.
Figure 8:
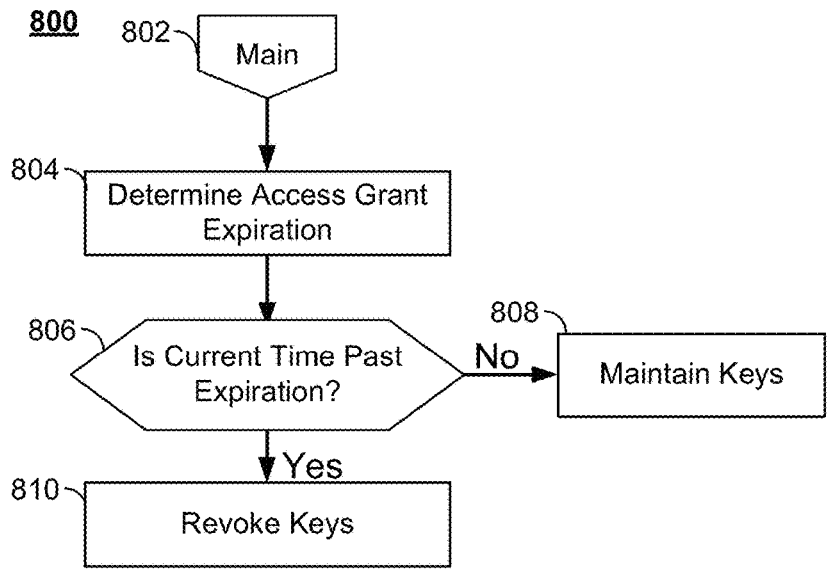
FIG. 8 is a flowchart of a detailed illustrative process for invalidating content rights using a content delivery system, in accordance with some embodiments of the disclosure.
Figure 9:
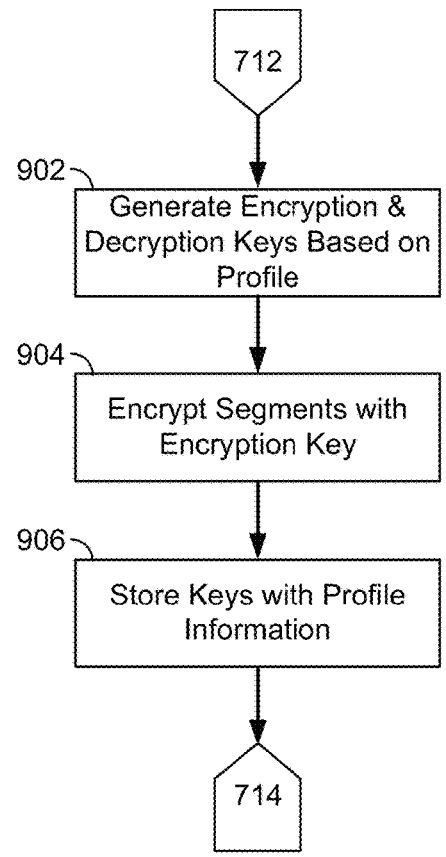
FIG. 9 is a flowchart of a detailed illustrative process for generating profile-specific encrypted segments of a content item using a content delivery system, in accordance with some embodiments of the disclosure.

The systems and devices described in FIGS. 1-4 enable the displays embodiments shown in FIG. 5-6 and the execution of processes described in FIGS. 7-9. It should be noted that each step of processes described in FIGS. 7-9 is performed by the previously described control circuitry (e.g., in a manner instructed to control circuitry 304 or 411). It should be noted that the embodiments of FIGS. 1-9 can be combined with any other embodiment in this description and are not limited to the devices or control components used to illustrate the processes.

FIG. 5 shows illustrative examples of interfaces and techniques for capturing content access information, in accordance with some embodiments of the disclosure. In FIG. 5, a content access server 501 receives content access confirmations from several systems, via for example communication through a communication network 505, that allow users to confirm their content rights with different techniques. These techniques are illustrative of embodiments that may be used to provide a content access server with a content access confirmation and are in no way limiting to this disclosure. For example, as described above, a content access server may receive messages from a third-party transaction server (e.g., a credit card processing system or movie ticketing system) that include details needed to confirm access to content.

In FIG. 5, a mobile device 510 is depicted as scanning a QR code from a content access token 512 (e.g., a movie ticket or movie purchase confirmation email). The mobile device 510 extracts information from the QR code and transmits a content access confirmation 513 to a content access server 501. In some embodiments, the QR code embeds a unique ID for the transaction, which is transmitted to the content access server 501 as the content access confirmation 513. The content access server 501 may then contact a third-party server to retrieve information associated with the transaction (e.g., a content item identifier, content access location, content access time, content access tier). The content access server 501 can then communicate a content access confirmation to the content delivery system as described with reference to FIG. 2. In some embodiments, the QR code from the content access token 512 embeds the information associated with the transaction (e.g., a content item identifier, content access location, content access time, content access tier). The mobile device 510 may also have access to information that identifies the profile of the user using the mobile device 510 (e.g., a profile identifier). The mobile device 510 may send the content access confirmation to the content access server 501 with the profile identifier, and the content access server 501 uses that profile identifier to associate the content access confirmation 513 with the user profile.

Also depicted in FIG. 5, an in-flight entertainment system is being used by a user to consume a content item (e.g., to watch an in-flight movie). The in-flight entertainment system is using a display 515 (e.g., a monitor on the back of a seat) to display a content item. When the in-flight entertainment system receives notification that it should stop playing content (e.g., as the plane is beginning to land or has reached the boarding gate), the in-flight entertainment system presents a prompt to a user to enter identifying information (e.g., email address, username and password, mobile device number). The in-flight entertainment system may then communicate a content access confirmation 517 to the content access server 501. The content access server 501 can then communicate a content access confirmation to the content delivery system as described with reference to FIG. 2. In some embodiments, the in-flight entertainment system could be a "bring your own device" type of system that allows for the use of a user's own content access device (e.g., mobile phone, tablet, computer) to watch the content. In this case, an application may store a timepoint for when content was interrupt and request content at a later time based on that timepoint.

Further depicted in FIG. 5, an in-flight entertainment system is being used by a user to consume a content item (e.g., to watch an in-flight movie). The in-flight entertainment system is using a display 515 (e.g., a monitor on the back of a seat) to display a content item and, as described above, offers the user the opportunity to associate the playback of the content item with the user's profile. In this scenario, the in-flight entertainment system uses display 522 to show a QR code to the user, similar to the scenario of scanning a QR code from a content access token 512. The mobile device 520 extracts information from the QR code and transmits a content access confirmation 523 to a content access server 501. The content access server 501 can then communicate a content access confirmation to the content delivery system as described with reference to FIG. 2.

The content delivery system can use the content access confirmation to generate and store a content access authorization that is used to grant access rights to a user for the content item.

FIG. 6 shows illustrative examples of determining that content playback was interrupted before completion of the content item, in accordance with embodiments of the disclosure. At point A, a user is attending a presentation of a content item at a content access location 604 depicted on map 602. The user's location is depicted by mobile device 606 which is located in a content access boundary 605 (e.g., a geofence). The mobile device 606 is associated with a user's profile and provides a GPS location to a content access server 630 which monitors the GPS location to determine whether the mobile device 606 leaves the content access boundary 605 and triggers an offer to the user to continue watching the content item associated with the user at t later date. At point B, the content access server 630 determines that the mobile device 606 has left the content access boundary 605. For example, the content access server 630 receives a GPS coordinates from the mobile device 606 and compares those coordinates to coordinates that designate a rectangle around the content access location 604. The content access server 630 may employ a box bounding algorithm to determine whether the GPS coordinates fall within the content access boundary 605. Upon determining that the mobile device 606 has left the content access boundary 605, the content access server 630 generates a content access bookmark 635 as described above and transmits the bookmark to the content delivery system. For example, the content access server 630 generates a content access bookmark 635 identifying the content item, the time point in the content item when the user's consumption was interrupted, and the profile of the user and sends content access bookmark 635 to an authorization server 640. The authorization server 640 may store the content access bookmark 635, or information from the bookmark, in a content access authorization that gives the user the right to consume the content on another system (e.g., on a mobile phone, tablet, computer, or set-top box).

FIG. 7 is a flowchart of a detailed illustrative process for providing content rights portability using a content delivery system, in accordance with some embodiments of the disclosure. It should be noted that each step of process 700 can be performed by control circuitry (e.g., in a manner instructed to control circuitry 411 by a content delivery application).

A main loop of a process for providing temporary access to a content item begins at step 702. At step 704, process 700 continues where a content delivery application resident in a content delivery system receives a content access confirmation for a profile. In some embodiments, the content delivery application receives a message indicating that a user completed a transaction, e.g., a transaction exists, for accessing the content item at a specific content access location. In some embodiments, the content delivery application receives a content access record indicating that the user's profile, or an identifier of the user, was used to obtain a content item on a second content access device (e.g., on an in-flight entertainment system). The content delivery system uses the content access confirmation to determine a content access location and a content item for the profile. For example, a mobile device (e.g., mobile device 201) may scan a ticket at a movie theater to confirm that a user was granted the rights to view a content item. The mobile device may then transmit information scanned from the movie ticket (e.g., unique transaction information from a QR code) to a content delivery system.

In some embodiments, the content delivery application performs step 704 according to steps 722-726. Specifically, the content delivery application, at step 722, receives, from a mobile device (e.g., mobile device 510), a content access code obtained from an optical capture. At step 724, the content delivery application receives an identifier of the user's profile from the mobile device. For example, a user scans a QR code from a movie ticket using an application on the user's mobile phone in which the user is logged in. The mobile device then utilizes API-based messaging to send information from the QR code along with information identifying the user to the content delivery system (e.g., a user ID, email address, telephone number). The content delivery system may continue process 700 at step 726 by confirming that the content access code was not previously received in connection with a different user profile. If the content delivery system determines the content access code was previously used by another user, the content delivery system may reject the content access code. In some embodiments, the content delivery system may take additional action such as sending a warning to the user about the fraudulent attempt or revoking rights of the user.

After receiving a content access confirmation, the content delivery application continues process 700 at step 706 by monitoring a device location for a device on which the profile is in use. For example, the content delivery application may request that the user's mobile device share its location or the content delivery application may monitor radio signals (e.g., Wi-Fi or Bluetooth) associated with the mobile device.

Process 700 continues at step 708, where the content delivery application determines whether the device location has moved from the content access location. For example, while monitoring the GPS coordinates of the mobile device, the content delivery system may determine that the mobile device has left a geographic boundary as described with reference to FIG. 6. In some embodiments, step 708 is accomplished by the content delivery application determining a geographic boundary surrounding the content access location and determining that the device location has moved from the content access location to outside the geographic boundary. In response to determining that the device location has moved from the content access location, process 700 continues at step 710 by generating a content access bookmark based on a content timeline and at step 712 storing a content access confirmation comprising the content access bookmark and an identifier from the profile. For example, the content delivery system may store a content access bookmark identifying the user profile in storage in an authorization server.

At step 714, the content delivery application then receives a content access request identifying the content item and the identifier from the profile. At step 716, in response to receiving the content access request, the content delivery application determines whether the content access request is approved based on the content access confirmation. For example, the content delivery application determines whether the user profile and content item identified in the content access request correspond to content rights provided to the user based on the content access confirmation received in step 704. At step 718, in response to determining that the content access request is approved based on the content access confirmation, the content delivery application transmits, to a content access device (e.g., a mobile phone, tablet, computer, or set top box), access information corresponding to segments of the content item based on the content access bookmark. For example, the content delivery system transmits URLs corresponding to missed segments of the content item along with decryption keys for the missed segments of the content item. In response to determining that the content access request is not approved, the content delivery application, in step 720, transmits a rejection message to the content access device.

FIG. 8 is a flowchart of a detailed illustrative process for invalidating content rights using a content delivery system, in accordance with some embodiments of the disclosure. It should be noted that each step of process 800 can be performed by control circuitry (e.g., in a manner instructed to control circuitry 411 by a content delivery application). At step 802, a main loop of a process for invalidating content rights begins. At step 804, process 800 continues with the content delivery application determining when an access grant expiration will occur that invalidates access granted to a user because of a content access authorization (e.g., a content access authorization generated in response to content access confirmation 513). For example, the content delivery application may have a policy set that all content rights gained via content access authorization will expire 48 hours after the rights are granted. Thus, the access grant expiration is set for the time at which the content access confirmation is received plus 48 hours. At step, 806 the content delivery application determines whether a current time is past the access grant expiration. For example, the content delivery application compares the current system time with the times set in the content access expirations. In some embodiments, the content delivery application performs a check of stored content access authorization and/or content access bookmarks to determine whether any have expired on a routine basis. In some embodiments, the content delivery application performs the check as content access requests are received.

At step 810, the content delivery application responds to determining that the current time is past the access grant expiration by revoking access rights. In some embodiments, the content delivery application controls access rights via a plurality of keys corresponding to segments of the content item corresponding to that access right. For example, the content delivery application may store keys specifically generated for a single user's access to missed content segments and encrypted copies of segments for that user. When the content delivery application determines that the rights have expired, the content delivery application may delete the keys and the encrypted segments to prevent further access. Furthermore, the content delivery application may store information indicating that access has expired. At step 808, the content delivery application responds to determining that the current time is not past the access grant expiration by maintaining access rights.

FIG. 9 is a flowchart of a detailed illustrative process for generating profile-specific encrypted segments of a content item using a content delivery system, in accordance with some embodiments of the disclosure. It should be noted that each step of process 900 can be performed by control circuitry (e.g., in a manner instructed to control circuitry 411 by a content delivery application). Process 900 begins after step 712 of process 700. At step 902, the content delivery application generates an encryption key and a corresponding decryption key for the content item specific to the profile. For example, the content delivery application may create a public-private key pair for Pretty Good Privacy (PGP) encryption using information for the user profile. The content delivery application may use pseudo-random information generated using information for the user's profile as a seed to create the encryption and decryption keys. At step 904, process 900 continues by encrypting, with the encryption key, segments of the content item corresponding to the portion of the content item designated by the the content access bookmark until the end of the content item. At step 906, process 900 stores at least the decryption key with the profile information.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in realtime. It should also be noted, the systems and/or methods described above may be applied to, or used in accordance with, other systems and/or methods.

What is claimed is:

1. A method for providing temporary access to content, the method comprising:
   receiving a content access confirmation for a profile, wherein the content access confirmation indicates a content access location and a content item;
   monitoring a device location for a device on which the profile is in use;
   determining that the device location has moved from the content access location;
   in response to determining that the device location has moved from the content access location:
      generating a content access bookmark based on a content timeline, and
      storing a content access authorization comprising the content access bookmark and an identifier from the profile;
   receiving a content access request identifying the content item and the identifier from the profile;
   determining whether the content access request is approved based on the content access authorization; and
   in response to determining that the content access request is approved based on the content access authorization, transmitting, to a content access device, access information corresponding to segments of the content item based on the content access bookmark.

2. The method of claim 1, further comprising:
   determining an access grant expiration for invalidating the content access authorization;
   determining whether a current time is past the access grant expiration; and
   in response to determining that the current time is past the access grant expiration, revoking a plurality of keys corresponding to segments of the content item.

3. The method of claim 1, further comprising:
   determining a geographic boundary surrounding the content access location; and
   wherein determining that the device location has moved from the content access location comprises determining that the device location has move beyond the geographic boundary.

4. The method of claim 1, wherein receiving a content access confirmation for a profile comprises receiving a message indicating that a transaction, for the profile, exists for accessing the content item at the content access location.

5. The method of claim 1, wherein receiving a content access confirmation for a profile comprises receiving a content access record indicating that an identifier of the profile was used to provide the content item on a second content access device.

6. The method of claim 1, wherein receiving a content access confirmation for a profile comprises:
   receiving, from a mobile device, a content access code obtained from an optical capture;
   receiving, from the mobile device, an identifier of the profile; and
   confirming that the content access code was not previously received in connection with a second profile.

7. The method of claim 1, wherein the access information comprising a plurality of access keys each for decrypting a corresponding one of the segments of the content item.

8. The method of claim 1, further comprising:
   generating an encryption key and a corresponding decryption key for the content item specific to the profile;
   encrypting, with the encryption key, segments of the content item corresponding to the portion of the content item from the content access bookmark to the end of the content item; and
   wherein the access information comprises the decryption key.

9. A system for providing temporary access to content, the system comprising:
   communication circuitry configured to receive a content access confirmation for a profile, wherein the content access confirmation indicates a content access location and a content item; and
   control circuitry configured to:
      monitor a device location for a device on which the profile is in use;
      determine that the device location has moved from the content access location;
      in response to determining that the device location has moved from the content access location:
         generate a content access bookmark based on a content timeline, and
         store a content access authorization comprising the content access bookmark and an identifier from the profile;
      process a content access request identifying the content item and the identifier from the profile;
      determine whether the content access request is approved based on the content access authorization; and
      in response to determining that the content access request is approved based on the content access authorization, generate, for a content access device, access information corresponding to segments of the content item based on the content access bookmark.

10. The system of claim 9, wherein the control circuitry is further configured to:
   determine an access grant expiration for invalidating the content access authorization;
   determine whether a current time is past the access grant expiration; and
   in response to determining that the current time is past the access grant expiration, revoke a plurality of keys corresponding to segments of the content item.

11. The system of claim 9, wherein the control circuitry is further configured to:

determine a geographic boundary surrounding the content access location; and wherein determining that the device location has moved from the content access location comprises determining that the device location has move beyond the geographic boundary.

12. The system of claim 9, wherein the control circuitry is configured to process a content access confirmation for a profile by determining whether a message indicating that a transaction, for the profile, exists for accessing the content item at the content access location.

13. The system of claim 9, wherein the control circuitry is configured to process a content access confirmation for a profile by determining that a content access record exists that indicates that an identifier of the profile was used to provide the content item on a second content access device.

14. The system of claim 9, wherein the control circuitry is configured to process a content access confirmation by:
receiving, from a mobile device, a content access code obtained from an optical capture;
receiving, from the mobile device, an identifier of the profile; and
confirming that the content access code was not previously received in connection with a second profile.

15. The system of claim 9, wherein the access information comprising a plurality of access keys each for decrypting a corresponding one of the segments of the content item.

16. The system of claim 9, wherein the control circuitry is further configured to:
generate an encryption key and a corresponding decryption key for the content item specific to the profile;
encrypt, with the encryption key, segments of the content item corresponding to the portion of the content item from the content access bookmark to the end of the content item; and
wherein the access information comprises the decryption key.

17. A non-transitory computer-readable medium having instructions encoded thereon that when executed by control circuitry cause the control circuitry to:
receive a content access confirmation for a profile, wherein the content access confirmation indicates a content access location and a content item;
monitor a device location for a device on which the profile is in use;
determine that the device location has moved from the content access location;
in response to determining that the device location has moved from the content access location:
generate a content access bookmark based on a content timeline, and
store a content access authorization comprising the content access bookmark and an identifier from the profile;
receive a content access request identifying the content item and the identifier from the profile;
determine whether the content access request is approved based on the content access authorization; and
in response to determining that the content access request is approved based on the content access authorization, transmit, to a content access device, access information corresponding to segments of the content item based on the content access bookmark.

18. The non-transitory computer-readable medium of claim 17, further having instructions encoded thereon that when executed by the control circuitry cause the control circuitry to:
determine an access grant expiration for invalidating the content access authorization;
determine whether a current time is past the access grant expiration; and
in response to determining that the current time is past the access grant expiration, revoke a plurality of keys corresponding to segments of the content item.

19. The non-transitory computer-readable medium of claim 17, further having instructions encoded thereon that when executed by the control circuitry cause the control circuitry to:
determine a geographic boundary surrounding the content access location; and
wherein determining that the device location has moved from the content access location comprises determining that the device location has move beyond the geographic boundary.

20. The non-transitory computer-readable medium of claim 17, wherein receiving a content access confirmation for a profile comprises receiving a message indicating that a transaction, for the profile, exists for accessing the content item at the content access location.

* * * * *